US011809728B2

(12) United States Patent
Coccia et al.

(10) Patent No.: US 11,809,728 B2
(45) Date of Patent: Nov. 7, 2023

(54) DATA STORAGE METHOD FOR MASSIVE DATASETS

(71) Applicant: Snyk Sweden AB, Stockholm (SE)

(72) Inventors: Julian Coccia, Malmö (SE); Daniel Akerud, Staffanstorp (SE)

(73) Assignee: Snyk Sweden AB, Stockholm (SE)

( * ) Notice: Subject to any disclaimer, the term of this patent is extended or adjusted under 35 U.S.C. 154(b) by 0 days.

(21) Appl. No.: 16/250,859

(22) Filed: Jan. 17, 2019

(65) Prior Publication Data

US 2020/0233599 A1 Jul. 23, 2020

(51) Int. Cl.
| | |
|---|---|
| G06F 3/00 | (2006.01) |
| G06F 3/06 | (2006.01) |
| G06F 16/25 | (2019.01) |
| G06F 16/23 | (2019.01) |
| G06F 7/14 | (2006.01) |
| G06F 11/10 | (2006.01) |
| G06F 21/60 | (2013.01) |

(52) U.S. Cl.
CPC .......... *G06F 3/0647* (2013.01); *G06F 3/0604* (2013.01); *G06F 3/0619* (2013.01); *G06F 3/0661* (2013.01); *G06F 3/0673* (2013.01); *G06F 7/14* (2013.01); *G06F 11/1004* (2013.01); *G06F 16/2365* (2019.01); *G06F 16/258* (2019.01); *G06F 21/602* (2013.01)

(58) Field of Classification Search
None
See application file for complete search history.

(56) References Cited

U.S. PATENT DOCUMENTS

| | | | | |
|---|---|---|---|---|
| 7,958,304 | B1* | 6/2011 | Goel | G06F 11/1096 711/170 |
| 8,868,520 | B1* | 10/2014 | Raghuwanshi | G06F 16/1752 707/692 |
| 2010/0161899 | A1* | 6/2010 | Asher | G11B 27/10 711/114 |
| 2012/0221606 | A1 | 8/2012 | Alvarez et al. | |
| 2018/0137293 | A1* | 5/2018 | Lucas | H04L 9/0894 |

OTHER PUBLICATIONS

European Search Report re Application No. 20151639.0.
Tector Garcia-Molina et al: "Chapter 12: Representing Data Elements" In: "Chapter 12: Representing Data Elements", Jan. 1, 2002, Prentice Hall, XP055114056, ISBN: 978-0-13-098043-4, pp. 567-604.
D Rachmawati et al: "A comparative study of Message Digest 5(MD5) and SHA256 algorithm", Journal of Physics: Conference Series, vol. 978, Mar. 1, 2018, p. 012116, XP055685169, GB ISSN: 1742-6588, DOI: 10.1088/1742-6596/978/1 /012116.

* cited by examiner

*Primary Examiner* — Midys Rojas
(74) *Attorney, Agent, or Firm* — Chernoff, Vilhauer, McClung & Stenzel, LLP

(57) ABSTRACT

Systems and methods for storing data in an intermediate format for storing, converting the intermediate data format into a production data format of two data volumes, and merging the two data volumes into one data volume.

8 Claims, 5 Drawing Sheets

Figure 1:
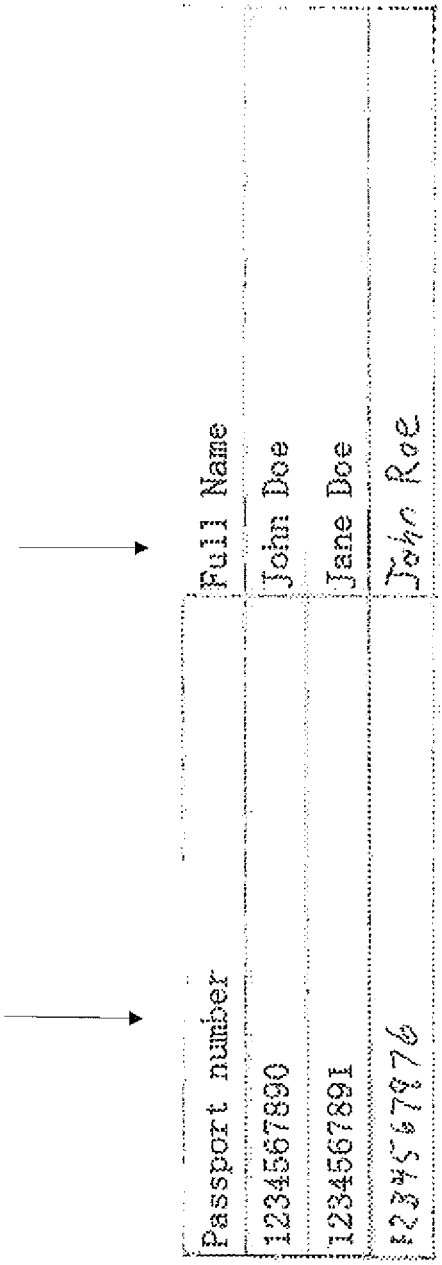

| File path | Contents |
|---|---|
| people/passports/e8 | e807f1fcf82d132f9bb018ca6738a19fJohn Doe |
| people/passports/0f | 0f7e44a922df352c05c5f73cb40ba115Jane Doe<br>0f0b54534d6982dd98aebfa7e285c4bdJohn Roe |

FIG. 3

DATA STORAGE METHOD FOR MASSIVE DATASETS

CROSS-REFERENCE TO RELATED APPLICATIONS

Not applicable.

BACKGROUND OF THE INVENTION

The present disclosure generally relates to code processing and data technologies.

When there is a need to perform single-key lookups on large sets (trillions of records) of static and read-only data, traditional DBMS (Database Management Systems) fall short not only on response times, but also on the time required to synchronize data across servers or to perform backups.

Given the simple task of single-key, read-only searching on large, static amounts of data, internal mechanisms in standard DBMS, including but not limited to concurrency control, access control, transaction handling, and logging hinder performance.

SUMMARY OF THE INVENTION

The following simplified summary is provided for a basic understanding of some aspects of various embodiments described in the present disclosure. The summary is not an extensive overview of the present disclosure. It is neither intended to identify key or critical elements of the claimed invention(s) nor to delineate the scope of the invention. The following summary merely presents some concepts used in embodiments described in the present disclosure in a simplified form as a prelude to a more detailed description of those embodiments.

An object of some embodiments described in the present disclosure is to arrange a system and a method for eliminating the overhead imposed by standard DBMS (Database Management Systems) systems. This is achieved by a data processing method comprising storing data in an intermediate format for storing, converting the intermediate data format into a production data format of two data volumes, and merging the two data volumes into one data volume.

The focus of some embodiments described in the present disclosure is also a data system comprising a storage unit that stores data in an intermediate format for storing, a converter unit that converts the intermediate data format into a production data format of two data volumes, and a merger unit that merges the two data volumes into one data volume.

The embodiments described herein may be based on storing data in an intermediate format by for storing and converting the intermediate data format into a production data format of two data volumes. The embodiments described herein may be also based on merging the two data volumes into one data volume.

A benefit of the embodiments described herein is that they can allow significantly higher performance rate than using standard database management systems.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Exemplifying and non-limiting embodiments of the present disclosure and their advantages are explained in greater detail below with reference to the accompanying drawings, in which:

FIG. 1 presents sample data, composed of passport numbers and full names.

Figure 2:
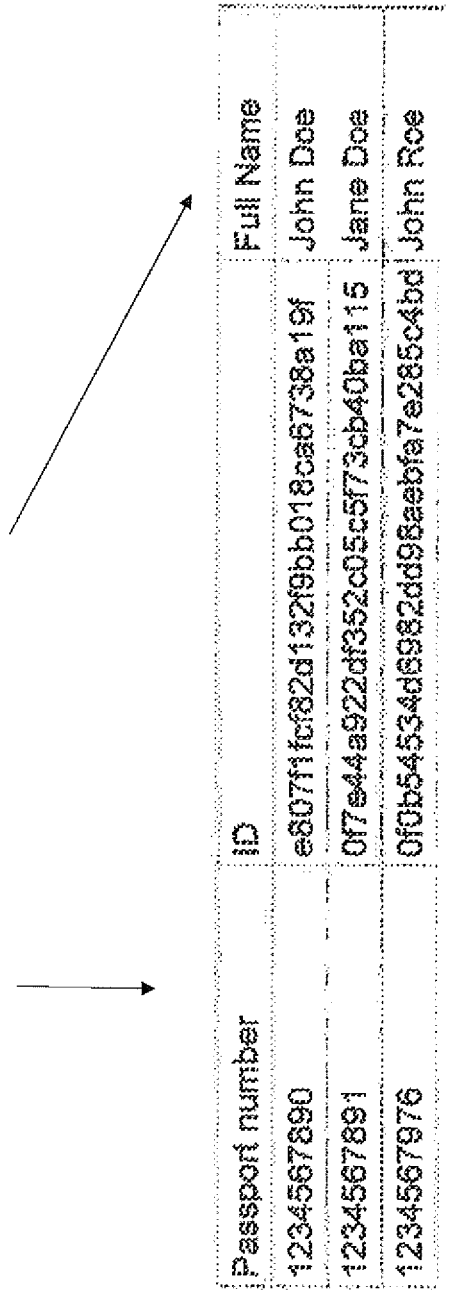

FIG. 2 presents sample data from FIG. 1, with the added record keys, which are the MD5 sum of the passports shown in FIG. 1.

FIG. 3 presents the resulting data of FIGS. 1 and 2 stored in a raw format.

Figure 4:

FIG. 4 presents the resulting data packed into production format (only bank 0f displayed, hex dump).

Figure 5:
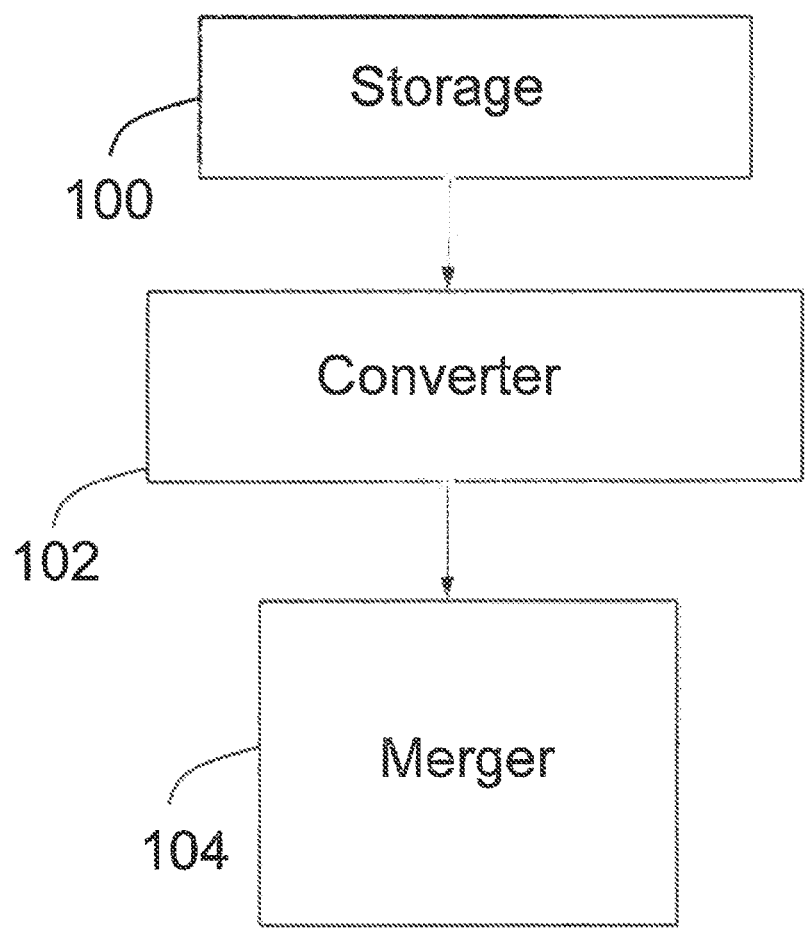

FIG. 5 presents a data system flowchart for processing the data of FIGS. 1-4.

DETAILED DESCRIPTION OF PREFERRED EMBODIMENTS

The embodiments described herein relate to a system and a method for eliminating the overhead imposed by standard database management systems (DBMS). This method involves using a cryptographic message digest to achieve a uniform distribution of hash values, i.e. hash keys, and relaying part of the index search effort to the file system itself. This means that part of the work is passed to the file system. Using part of the hash for the filename allows the banks to be smaller in size as compared to storing the full hash in the database. Moreover, given that each filename requires a name for the file, this space is essentially free. In other words, part of the hash may be used in the file system file allocation table.

Preferably, datasets may be divided into data banks, and part of the data key may be stored in file and directory names, which delegates a part of the index searching task to the file system. Data updating is preferably performed on batches without service disruption.

The disclosed data storage method may involve three phases: Data capture stores data in an intermediate (raw format) format that ensures the fastest possible data recording. Data packing converts the captured data into a production-ready format (production format) on which fast queries can be performed. When the intermediate format is processed and stored, a production format is achieved for fastest possible lookup tables (LUTs). Data merging merges at least two existing data volumes into a single volume.

The data storage methods described in present patent application overcome defects of prior art DBMS solutions for delivering high performance queries on large datasets. Datasets described in the present patent application feature a single key and a variable data field that can be updated without service disruption. Data is stored in a portable format that allows coding implementations in different computer environments and platforms.

In one exemplary embodiment, the purpose of the data capture mechanism is to provide the fastest possible storage of data for future processing and merging. Therefore, data capture may be run in an unlimited number of machines, merged together at a later stage, and then transferred to production.

Data sets are composed of two fields: a data index and a data record. The data index is converted into a message digest, using a cryptographic algorithm of choice, with the purpose of providing a uniform distribution of indexes. Data records preferably do not have a fixed-length, but may in some embodiments be limited to a predetermined maximum length.

In one exemplary embodiment, information from a data collection is stored in individual flat-files called data banks. These data banks are named after the first N (addressing) nibbles of the data index and can contain e.g. plain-text information or information in binary form, with one line per data record. The line is the data index, followed by the entire data record.

Information can be captured in different instances and information in raw format can be merged by simply concatenating data banks together, for example, by using colon-separated fields or expressing everything in JSON format. This may result in duplicated information, but any duplicate information is eliminated during data packing.

In one exemplary embodiment, illustrated in FIGS. 1 and 2, given a simple passport number and full name data structure, the desired key may be the passport number. The data index (passport number) can be converted into a message digest using the MD5 cryptographic algorithm.

Assuming the information will be saved in a database volume named people containing a data volume named passports, with a data bank addressing of two nibbles, the data in FIG. 2 may be recorded in a raw format in two data banks as presented in FIG. 3. Using two nibbles will result in a maximum of 256 data banks for the passports data volume.

In another exemplary embodiment, the process of data packing converts a raw format data volume into production format, During this process, data banks may be sorted, eliminating duplicated records, and then data banks may be converted into two files: Index and data, for which the .index and .data file extensions are used in this description.

Data indexes may be converted from hex (ASCII) to binary and placed in the index file along with fixed-length data pointers to the data records in the .data file. The nibbles from the index present in the bank name may be removed from the index file. Given the small size of index files, they can be copied into RAM for faster seek times. Data files contain a concatenation of all data records. Each record preferably contains a header describing the record length and an optional integrity checksum.

In the one exemplary embodiment, data pointers are set to 32-bits, which allows a maximum data bank size of 4 Gb, record lengths are a single byte, which allows a maximum data record size of 256 bytes, and data checksums are set to a single byte.

Using the raw format from FIG. 3, taking the bank 0f, the data bank will look as follows: The 0f bank contains two records, stored in the 0f.data file. These two records are displayed in the contents of the 0f.data file in FIG. 4. Data records are preceded by a two-byte header declaring record size and checksum. Both records are 8 bytes long and checksums are (hex) 97 and c6, respectively.

The bank index file 0f.index contain the remaining 15 bytes from the record keys (note that the first byte is in the file name), followed by the 32-bit (4-byte) pointer to the start of the record in the data file (byte 0 and byte 10, respectively).

In another exemplary method, data merging may comprise joining a source data volume into a destination data volume. Merging can be performed on a raw format data volume by simply concatenating the individual data banks.

The binary merge of a production format data volume may comprise processing the data banks inside the data volume and merging them into a temporary data bank, which has a unity in the destination volume. Once the data bank is merged, it is moved over the destination data bank. This allows data to be updated without having to disrupt service.

Merging of two data banks may be performed by processing each record on the bank and writing them in order into the merged bank by skipping duplicates.

Retrieving of data records may comprise performing a search by using a specific search algorithm such as an interpolation search or a logarithmic search in the index file for the corresponding data bank, obtaining the data location from the pointer, and obtaining the data length by subtracting the pointer to the pointer of the next record (or the data file length in case of the last record).

FIG. 5 presents a data system flowchart according to an exemplifying and non-limiting embodiment of the present disclosure. The data system may comprise a storage unit 100 that stores data in an intermediate format for storing, and a converter unit 102 that converts the intermediate data format into a production data format of at least two data volumes. The conversion can be performed by using e.g. cryptographic algorithm processing. The at least two data volumes can be e.g. a data index and a data record. In one exemplary embodiment, the data index can be located in a binary form in an index file along with fixed-length data pointers to the data records in the data records file. The data index can be converted from intermediate format to production format.

The data system further comprises a merger unit 104 that mergers the at least two data volumes into one data volume. In one exemplary embodiment, the data records can be retrieved by performing a search on the data index file, obtaining the data location from a given pointer, and obtaining the data length by subtracting the value of the given pointer from the value of the pointer of the next data record, or if the given pointer is the last pointer in the data volume, subtracting the value of the given pointer from the data volume length. Each data record volume may contain a header describing the data record length and an optional integrity checksum.

The data system, e.g. the units 100, 102 and 104, can be implemented e.g. by processor-based computer and microprocessor techniques to use the algorithms and to implement the methods according to the present invention.

The specific examples provided in the description given above should not be construed as limiting the scope and/or the applicability of the appended claims.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A data processing method comprising:
   storing data in an intermediate format, the intermediate format comprising at least two data volumes, and
   merging and converting by a converter unit the data in an intermediate format into a production format by using cryptographic algorithm processing, the production format including an index file and a data file.

2. The data processing method of claim 1 where the index file contains a data index being expressed in a binary form and includes fixed-length data pointers to data records in its associated data file.

3. The data processing method of claim 1 where the data file comprises a plurality of data records, each data record contains a header describing at least one of a data record length and an integrity checksum.

4. The data processing method of claim 1 where the at least two data volumes are retrieved by performing a search on the index file, obtaining a data location from a pointer, and obtaining a data length by subtracting a value associated with the pointer from a selected one of the data volume length and a value associated with a pointer for a next sequential data record.

5. A data system comprising:
   a storage unit that stores data in an intermediate format, comprising at least two data volumes, and
   a converter unit that merges and converts the data in an intermediate format into a production format by using cryptographic algorithm processing, the production format including an index file and a data file.

6. The data system of claim 5 where the index file contains a data index being expressed in a binary form and includes fixed-length data pointers to data records in its associated data file.

7. The data system of claim 5 where the data file comprises a plurality of data records, each data record contains a header describing the data record length and an optional integrity checksum.

8. The data system of claim 5 where the at least two data volumes are retrieved by performing a search on the index file, obtaining a data location from a pointer, and obtaining a data length by subtracting a value associated with the pointer from a selected one of the data volume length and a value associated with a pointer for a next sequential data record.

* * * * *